March 8, 1932.  M. KITAMURA ET AL  1,848,830
ELECTRICAL REGULATOR
Filed Feb. 25, 1931
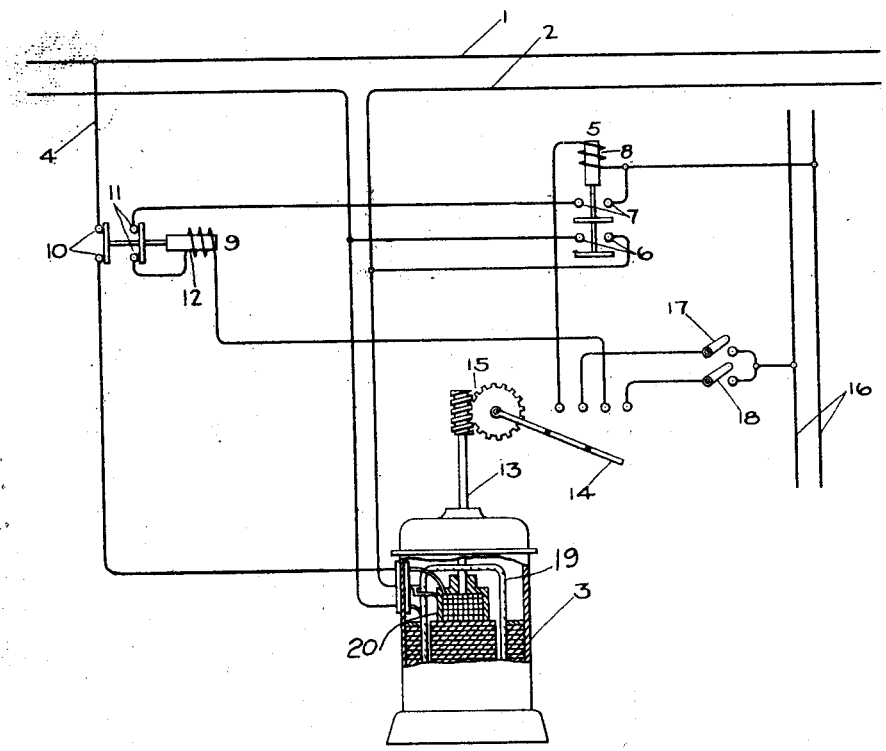
Inventors:
Mokiti Kitamura,
Kunpei Yamazaki.
by Charles W. Allen
Their Attorney.

Patented Mar. 8, 1932

1,848,830

UNITED STATES PATENT OFFICE

MOKITI KITAMURA, OF KANAGAWAKEN, AND KUNPEI YAMAZAKI, OF TOKYO, JAPAN, ASSIGNORS TO GENERAL ELECTRIC COMPANY, A CORPORATION OF NEW YORK

ELECTRICAL REGULATOR

Application filed February 25, 1931, Serial No. 518,154, and in Japan June 28, 1930.

Our invention relates to electrical regulators and more particularly to the control and protection of feeder voltage regulators.

At the present time the most generally used feeder voltage regulators are of two different types. One type is the induction feeder voltage regulator in which the amount of voltage buck or boost inserted in the regulated circuit is controlled by varying the inductive relation of the windings of the regulator. The other type is the transformer tap changing type in which the amount of voltage buck or boost which is needed for regulating purposes is varied by changing taps on one of the windings of the regulating transformer, so as to vary its ratio. Both types are however essentially the same in that they both have a series winding connected in the regulated circuit and in which the necessary regulating voltage buck or boost is induced by an inductively related shunt winding which is connected across the regulated circuit. Both types of regulator have an extreme voltage boost position, an extreme voltage buck position, and a neutral position. In the induction regulator, the neutral position is when the axes of the series and shunt windings are 90 degrees apart for in this position there will be no transformer action between the windings and consequently there will be neither a voltage buck nor a voltage boost produced. In the tap changing type the neutral position is attained when one of the windings, usually the shunt winding, has no net ampere turns.

It is often desirable to take a feeder regulator out of service while it is connected to a live feeder. One instance when this is desirable is when the regulator develops an internal fault such as a short-circuited or grounded winding. As the regulator comprises a series winding connected in the regulating circuit and a shunt winding connected across the regulating circuit, it is necessary when taking the regulator out of service to short-circuit the series winding and to open circuit the shunt winding. If the series winding is short circuited when the regulator is in any position other than its neutral position, a heavy current will flow in the series winding due to the voltage buck or boost induced in this winding by the shunt winding. Such a heavy current is very likely to injure the regulator by burning out the series winding or by injuring its insulation. If on the other hand the shunt winding circuit is opened when the regulator is in a position other than its neutral position, the effect will be similar to that opening the secondary winding circuit of a transformer which is carrying a load with the result that the regulator is likely to be injured if this is done.

The first step in taking a regulator out of service on a live feeder is therefore to bring the regulator to its neutral position. If the regulator is a perfect regulator, it is immaterial whether the series winding is short-circuited before the shunt winding is open circuited or whether the shunt winding is open circuited before the series winding is short-circuited provided that the regulator is in its neutral position, because in such a position there will then be no transformer action between the windings. However, in regulators of the induction type the air gap between the windings is sometimes eccentric, or there may be such a fault in one of the windings that when the regulator is in its neutral position there will still be a slight transformer action between the two windings. Under such circumstances it has been found that it is preferable to short-circuit the series winding first and then open the shunt circuit winding.

In accordance with our invention we provide a normally open circuit controller for short-circuiting the series winding, a normally closed circuit controller for opening the shunt winding and interlocking control circuits for the circuit controllers which make it necessary to first bring the regulator to its neutral position before the series winding can be short-circuited and to first short-circuit the series winding before the shunt winding may be open circuited.

An object of our invention is to provide a new and improved protective and control system for a feeder voltage regulator.

Another object of our invention is to provide a protective and control system for a feeder voltage regulator which requires a certain predetermined sequence of operation in taking the regulator out of service.

Our invention will be better understood from the following description taken in connection with the accompanying drawing and it scope will be pointed out in the appended claims.

Referring now to the single figure of the accompanying drawing wherein we have shown an embodiment of our invention as applied to a single phase induction regulator, 1 and 2 represent the conductors of a single phase alternating current feeder circuit to which is connected a single phase induction voltage regulator 3. Regulator 3 has a series winding 19 connected in conductor 2 and a shunt winding 20 connected between conductors 1 and 2 by conductor 4.

Connected so as to be able to short-circuit the series winding of the regulator 3 is a normally open circuit controller 5 having main contacts 6, back contacts 7 and an operating magnet 8. Connected so as to be able to break the circuit of the shunt winding regulator 3 is a normally closed circuit controller 9 having main contacts 10, back contacts 11, and an operating coil 12. Circuit controller 9 preferably is an oil circuit breaker because of the fact that it usually must break a comparatively high voltage circuit. Associated with a rotatable element of regulator 3, such as the shaft 13 of the rotor of the regulator, is a master circuit controller 14 connected thereto by any suitable motion transmitting means, such as gearing 15. This circuit controller is so related to the energizing circuits of operating coils 8 and 12 that these coils may only be energized when this circuit controller is in its closed position. Circuit controller 14 is so arranged that it only closes its contacts when the regulator is in its neutral position. A suitable source of current supply, such as the supply circuit 16, is employed to energize the operating coils 8 and 12 of the circuit controllers 5 and 9 which are under the control of switch 14. A pair of manually controlled switches 17 and 18 are provided for completing the energizing circuits of the operating windings of the circuit breakers 5 and 9 respectively. Coil 8 is energizable from supply circuit 16 through a circuit which is completed through switch 17 and the upper contacts of switch 14. Operating coil 12 of circuit breaker 9 is energized from supply circuit 16 through a circuit which is completed by the concurrent closure of switch 18, lower contacts of switch 14 and back contacts 7 of circuit controller 5.

The operation of the illustrated embodiment of our invention is as follows: As soon as it is necessary or desirable to take regulator 3 out of service the regulator is brought to its neutral position by any suitable means. Switch 17 is then closed provided that it has not already been closed. An operating circuit will then be completed from the supply circuit 16 through switch 17, the upper contacts of switch 14, operating coil 8 of circuit breaker 5, back to the other side of supply circuit 16. Operating coil 8 of circuit breaker 5 is thus energized with the result that contacts 6 are closed thereby short-circuiting the series winding of regulator 3. At the same time back contacts 7 of circuit breaker 5 are closed thereby putting the operating winding 12 of circuit breaker 9 under the control of manually operated switch 18 through the following circuit. One side of supply circuit 16, switch 18, lower contacts of switch 14, operating coil 12 of circuit breaker 9, back contacts 11 of this circuit breaker, back contacts 7 of circuit breaker 5 to the other side of the supply circuit 16.

It will be obvious to those skilled in the art that our invention is not limited to the use of two separate manual control switches 17 and 18 and if desired these switches may be mechanically connected so that they work together or it may be so arranged that one switch will take the place of both. In this manner upon the closure of a single manual control switch the regulator will be taken out of service in the proper sequence automatically as soon as it is brought to its neutral position. It will also be apparent to those skilled in the art that our invention is not limited to use in connection with induction regulators and that it is equally applicable to use with tap changing regulators, without departing from our invention in its broader aspects. In this connection it should be noted that our invention may be used with a tap changing regulator which is associated with a polyphase feeder because a tap changing feeder regulator for polyphase circuits merely consists of as many single phase tap changing regulators as there are phases. On the other hand, polyphase induction regulators, due to the inductive relationship of all of their shunt windings with all of their series windings are not well adapted for use with our invention. This is because in the polyphase induction regulators the buck or boost is really produced by changing the phase of the regulating voltage which is introduced in the feeder circuit and not by changing the magnitude of the regulating voltage. Thus, in a polyphase induction regulator the series windings have a voltage induced in them regardless of the position of the rotor element of the regulator.

While we have shown and described a particular embodiment of our invention, it will be obvious to those skilled in the art that changes and modifications may be made without departing from our invention in its broader aspects and we therefore aim in the appended claims to cover all such changes and modifications as fall within the true spirit and scope of our invention.

What we claim as new and desire to secure by Letters Patent of the United States, is:

1. In combination, an alternating current circuit, a variable ratio transformer type voltage regulator connected to said circuit, said regulator including a series winding connected in said circuit, and a shunt winding connected across said circuit, said regulator having a neutral position, and means operative upon the attainment of said position of said regulator for sequentially disconnecting the windings thereof from said circuit.

2. In combination, a feeder voltage regulator having a series winding and a shunt winding, a circuit breaker for short-circuiting said series winding, a circuit breaker for open-circuiting said shunt winding, an interlocking connection between said circuit breakers whereby the circuit breaker for open-circuiting the shunt winding can not be operated before the circuit breaker for short-circuiting the series winding is operated.

3. In combination, an electric circuit, a feeder voltage regulator having a neutral position connected to said circuit, a circuit controller operatively connected to said regulator and adapted to be put in a circuit-closing position when said regulator is in its neutral position, and means operative in accordance with the closure of said circuit controller for disconnecting the windings of said regulator from said circuit.

4. A protective system for a feeder voltage regulator having a series winding and a shunt winding comprising means operative in accordance with the position of said regulator for short circuiting its series winding and later open-circuiting its shunt winding.

5. In combination, an alternating current circuit, a two-winding transformer having one of its windings connected in said circuit and the other winding connected across said circuit, means for short-circuiting said series connected winding, means for open-circuiting said shunt connected winding, means for arranging said windings so that there is no transformer action between them, a normally open circuit controller which attains a closed position when there is no transformer relationship between said windings, and interlocking means under the control of said circuit controller for first operating said short-circuiting means of the series winding and then operating the open-circuiting means for said shunt winding.

6. In combination, an alternating current circuit, an induction feeder voltage regulator having a series winding connected in said circuit and a shunt winding connected across said circuit, means for rotating said windings with respect to each other, a circuit controller, means for moving said circuit controller to a closed position when the windings of said regulator have their axes displaced 90 degrees from each other, a normally open circuit breaker for short-circuiting the series winding of said regulator, a circuit under the control of said circuit controller for causing said normally open circuit breaker to short-circuit the series winding of the said regulator, a normally closed circuit breaker for opening the series winding circuit of said regulator and means under the joint control of said circuit controller and the circuit breaker which short-circuits said series winding for causing the operation of said circuit breaker which open circuits said shunt winding circuit.

In witness whereof we have hereunto set our hands this 30th day of January, 1931.

MOKITI KITAMURA.
KUNPEI YAMAZAKI.